(12) United States Patent
Horsky et al.

(10) Patent No.: US 7,280,333 B2
(45) Date of Patent: Oct. 9, 2007

(54) METHOD AND DEVICE FOR SHORT CIRCUIT OR OPEN LOAD DETECTION

(75) Inventors: Pavel Horsky, Brno (CZ); Ivan Koudar, Slapanice U Brna (CZ)

(73) Assignee: AMI Semiconductor Belgium BVBA, Oudenaarde (BE)

( * ) Notice: Subject to any disclaimer, the term of this patent is extended or adjusted under 35 U.S.C. 154(b) by 597 days.

(21) Appl. No.: 10/810,303

(22) Filed: Mar. 26, 2004

(65) Prior Publication Data
US 2004/0257735 A1 Dec. 23, 2004

(30) Foreign Application Priority Data
Apr. 2, 2003  (EP) ................................. 03447077

(51) Int. Cl.
*H02H 3/00* (2006.01)
(52) U.S. Cl. ..................................... 361/93.1; 702/117
(58) Field of Classification Search ................ 324/522; 702/117; 361/93.1
See application file for complete search history.

(56) References Cited

U.S. PATENT DOCUMENTS

| 4,962,350 | A | * | 10/1990 | Fukuda ....................... 323/283 |
|---|---|---|---|---|
| 5,294,890 | A | * | 3/1994 | Hemminger et al. ........ 324/549 |
| 5,430,438 | A | * | 7/1995 | Joos et al. .................... 340/3.9 |
| 5,886,510 | A | * | 3/1999 | Crespi et al. ................ 323/273 |
| 6,226,602 | B1 | * | 5/2001 | Schmitt et al. ............. 702/117 |
| 2004/0004483 | A1 | * | 1/2004 | Hazelton ..................... 324/522 |

\* cited by examiner

*Primary Examiner*—Ronald W. Leja
(74) *Attorney, Agent, or Firm*—Trop, Pruner & Hu, P.C.

(57) ABSTRACT

A method or apparatus is provided for detecting an error condition associated with a load ($R_L$) or a connection (P) to the load ($R_L$). The load ($R_L$) may comprise an energy storing element (Cext). During a first diagnosis phase, it is determined whether the load ($R_L$) or the connection (P) to the load ($R_L$) is in a normal operation condition or in an error condition. If the load ($R_L$) or the connection (P) to the load ($R_L$) is in an error condition, during a second diagnosis phase it is determined whether the error condition is an open load condition, short circuit condition to ground or a short circuit condition to a power supply. When the load is in a starting state before the first diagnosis phase, the method or apparatus may further comprise carrying out, after the second diagnosis phase, a resetting phase for resetting the load to the starting state.

19 Claims, 2 Drawing Sheets

METHOD AND DEVICE FOR SHORT CIRCUIT OR OPEN LOAD DETECTION

TECHNICAL FIELD OF THE INVENTION

The present invention relates to methods and circuits for detecting error conditions such as open load or short circuit conditions on a pin.

BACKGROUND OF THE INVENTION

Several types of circuits used for detecting open load or short circuit condition on a pin exist. Some of those are not able to distinguish between open load and short circuit condition.

U.S. Pat. No. 4,962,350 describes an automatic load condition detection system for detection of a normal or abnormal load condition. The system described distinguishes between short circuit condition and open load condition. A two-phase measurement is used. During a first phase, a load current is supplied to a load from a power source device. In a first phase, a discrimination is made between an abnormal operating condition with the load in an open circuit condition, and another operating condition. If, during the first phase, it is detected that the load is not in an open circuit condition, then during a second phase there is discriminated between a normal operating condition and short circuit condition of the load. If either a short circuit condition or an open circuit condition of the load is detected, then either a short circuit detection signal or an open circuit detection signal representing said condition is outputted from the load condition detection system.

The device described in the above document is not able, once a short circuit condition has been detected, to distinguish between short circuit to battery or short circuit to ground.

In WO 92 21985, a circuit for checking the operating state or status of a sensor is described. The circuit comprises a first testing transistor which blocks when VHPL<Vcontrol, TR1 because of short circuit to ground or interruption, a second testing transistor which blocks when LPL is grounded during short circuit to ground and a third testing transistor which blocks when HPL and LPL have a potential of the electron receiving electrode with respect to the minimum control voltage. Combination of the switching states of the three testing transistors indicates the operating state of the sensor, i.e. distinguishes between operational, short circuit to ground, short circuit to supply voltage and interruption.

In WO 92 21985, distinction can been made between short circuit to ground and short circuit to supply voltage as well. This is done by the combination of the different testing transistors. One disadvantage, however, of the method described in WO 92 21985 is that a resistor is permanently taking current, which results in a continuous energy loss.

U.S. Pat. No. 6,226,602 provides a circuit arrangement and a method with which short circuit to ground or to supply voltage and open load can be distinguished. The method in this document comprises: providing a first circuit and detecting a first state being defined by a short circuit to the supply voltage and providing a second circuit and detecting a second state or a third state, the second state being defined by a short circuit to ground and the third state being defined by interruption of the connection to the supply voltage.

The method in this document is able to distinguish between short circuit to ground, short circuit to supply voltage and interruption of the connection to the supply voltage. The method first determines whether a fault-free or a fault condition is present and then determines whether the fault condition is an interruption of the connection to the supply voltage, a short circuit to ground or a short circuit to supply voltage.

U.S. Pat. No. 5,920,452 describes a method for protecting a circuit from overcurrent condition and for detecting an open load. The method comprises determining if there is a normal operation or an abnormal operation (load is for some reason not present (open load) or shorted to ground or to supply voltage) and providing a microprocessor having a microprocessor terminal configurable as an output for generating a command signal to an electrical load as an input for monitoring the condition of the open load. Furthermore, an output logic signal is generated form the second transistor back to the microprocessor and the first transistor, to latch the first transistor into one of either ON or OFF states under normal load conditions responsive to the receipt of a command signal from the microprocessor. Under abnormal load conditions, the first transistor is maintained in an OFF state upon an overcurrent condition through the first transistor, and a logic signal is maintained to the microprocessor after repeated attempts to switch the first transistor into an OFF state based on an open electrical load condition. In this way, using the method according to U.S. Pat. No. 5,920,452 it is possible to distinguish between open load, short circuit to ground and short circuit to supply voltage.

SUMMARY OF THE INVENTION

It is an object of the present invention to provide a method and device for detecting error conditions on a pin, more particularly to provide a method and device for detecting error conditions which discriminates between open load condition, short circuit to battery or short circuit to ground.

The above objective is accomplished by a method and device according to the present invention.

The present invention provides a method for detecting an error condition associated with a load or a connection to the load, comprising:

during a first diagnosis phase, determining whether the load and/or the connection to the load are in a normal operation condition or in an error condition, and if the load and/or the connection to the load is in an error condition, during a second diagnosis phase determining whether the error condition is an open load condition, short circuit condition to ground or a short circuit condition to a power supply, wherein the second diagnosis phase comprises changing a first parameter associated with the load in an attempt to escape from the error condition.

In a method according to the present invention, the load is connected to a pin. The second diagnosis phase may comprise changing the amplitude of the current flowing in or out the load so as to change a voltage on the pin. The amplitude of the current may be changed so as to be larger than a minimum level $$IDiagMin = \frac{\Delta V \cdot A_{ext}}{t},$$

$\Delta V$ being a reference voltage, $A_{ext}$ being a memory value of an energy storing element, for example a capacitance of an external capacitor, and t being the time between the change of the amplitude of the current and a moment of measuring a voltage on the pin.

The second diagnosis phase may comprise changing the polarity of the current flowing in or out the load so as to escape from the error condition. The load may comprise an energy storing element, such as a capacitor or an inductor, e.g. an external capacitor applied to filter out noise from the load signal.

In a method according to the present invention, where the load is in a starting state before the first diagnosis phase, the method may further comprise carrying out, after the second diagnosis phase, a resetting phase for resetting the load to the starting state. With a starting state is meant the amplitude and sense of e.g. current flowing into or out the memory element, or of a voltage drop across the memory element.

The first diagnosis phase may comprise monitoring whether a second parameter associated with the load is below a first pre-determined low level or is above a second pre-determined high level, i.e. goes outside a predetermined window, and if so, reporting that the load is in an error condition. The second parameter may be a voltage drop across the load and the first parameter may be a current flowing in or out the load. Alternatively the second parameter may be current, and the first parameter may be a voltage.

The resetting phase may comprise changing a third parameter associated with the load. Most often, the third parameter will be the same as the second parameter which is changed during the second diagnosis phase. The third parameter may be current through the load, wherein the polarity of the current flowing in or out the load is changed with respect of the polarity of the current flowing through the load during the second diagnosis phase.

The present invention also provides an error detection apparatus for detecting an error condition associated with a load or a connection to the load. The apparatus comprises:
- first diagnosis means for determining whether the load and/or the connection to the load are in a normal operation condition or in an error condition, and
- second diagnosis means for, if the load and/or the connection to the load is in an error condition, determining whether the error condition is an open load condition, short circuit condition to ground or a short circuit condition to power supply, and wherein the second diagnosis means comprises means for changing a first parameter associated with the load in an attempt to escape from the error condition.

The means for changing a first parameter may comprise means for changing the polarity of a current flowing in or out the load or may comprise means for changing the amplitude of a current flowing in or out the load.

The load may comprise an energy storing element such as a capacitor or an inductor for example.

An apparatus according to the present invention, for detecting an error condition on the load in a starting state, may further comprise resetting means for resetting the load to the starting state.

The first diagnosis means may comprise means for monitoring whether a second parameter associated with the load is below a first pre-determined low level or is above a second pre-determined high level, and reporting means for reporting that the load is in an error condition. The second parameter may be a voltage drop across the load. The first diagnosis means may comprise comparing means for comparing the second parameter with the pre-determined low level and with the pre-determined high level. The comparing means may comprise at least one comparator.

The first parameter may be a current flowing in or out the load. When the load is connected to a pin, the second diagnosis means may comprise means for changing the amplitude of the current flowing in or out the load so as to change a voltage on the pin. The means for changing the amplitude of the current may change the current so as to be larger than a minimum level $$IDiagMin = \frac{\Delta V \cdot A_{ext}}{t},$$

$\Delta V$ being a reference voltage, $A_{ext}$ being a memory value of the energy storing element, for example capacitance of external capacitor $C_{ext}$, and t being the time between the change of the amplitude of the current and a moment of measuring the voltage on the pin.

The second diagnosis means may comprise polarity changing means for changing the polarity of the current flowing in or out the load so as to escape from the error condition.

The resetting means may comprise means for changing a third parameter associated with the load. The third parameter may be current through the load, wherein the polarity of the current flowing in or out the load is changed with respect of the polarity of the current flowing through the load during the second diagnosis phase.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
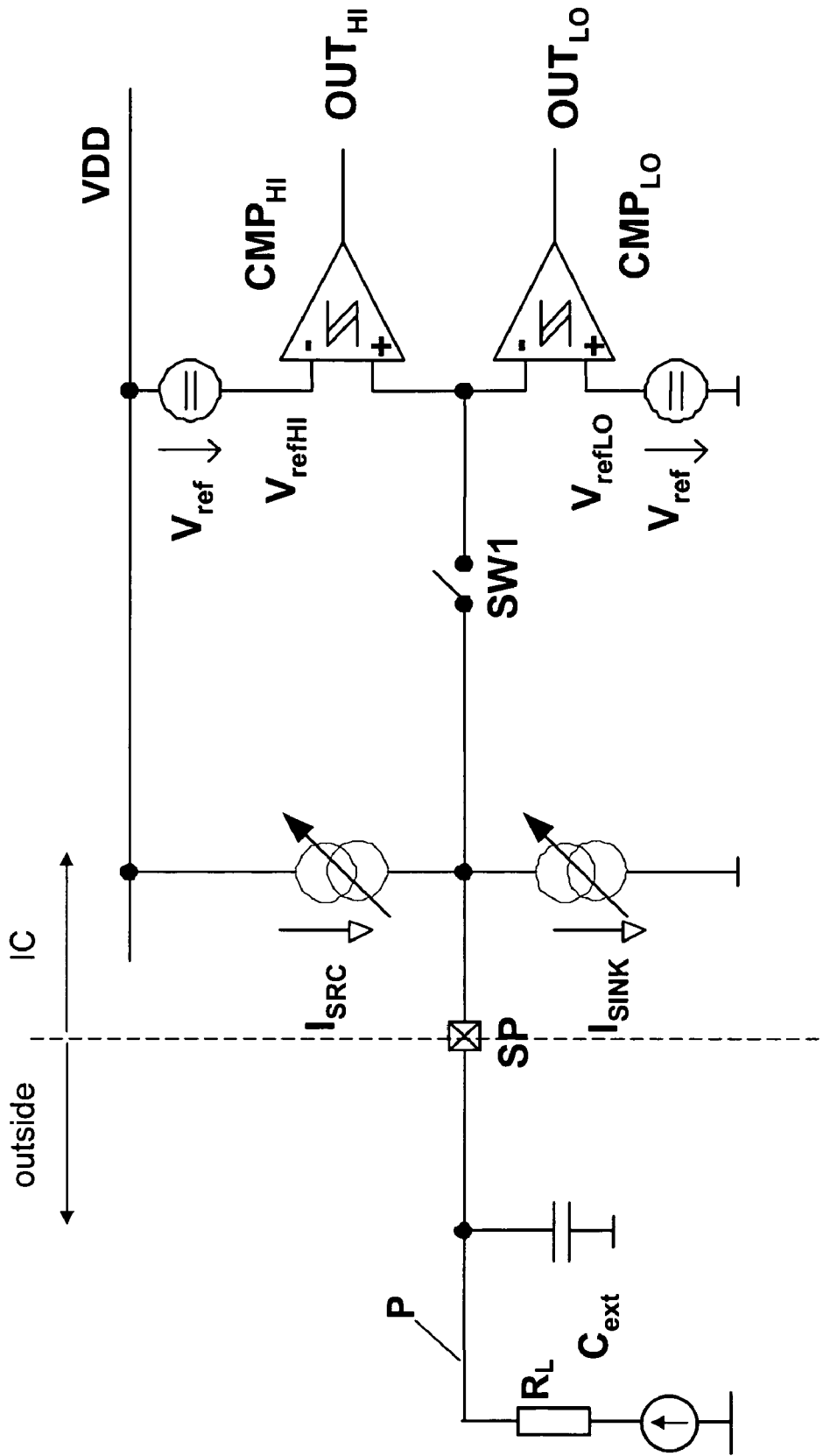
FIG. 1 illustrates a circuit for error detection on a load according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

According to an embodiment of the present invention, voltage on a selected sensor pin SP, to which a current source is connected, is monitored. In a first phase, it is determined whether a load is in a normal or abnormal operation condition. With "load" in the present patent application is not only meant the external load $R_L$ itself, but also the connection P to said external load $R_L$. Not only the load $R_L$ can be defective; also the connection P to that load $R_L$, the wire, can be broken or shorted to battery (power supply level) or ground. All these conditions should result in a defective load error message.

If the load is in an abnormal operation condition, then in a second phase, it is determined whether the load is in a short to battery, short to ground or open load condition. When an open load failure appears, this is detected in every measurement cycle.

The above diagnosis on a sensor pin SP is done regularly, repeating with some repetition period. It is important that, once an error has been detected, this error is correctly detected in all diagnosis runs. Therefore, a resetting phase is introduced.

According to an embodiment of the present invention, a circuit for detection of error conditions —short to battery, short to ground or open load —comprises two current sources $I_{SRC}$ and $I_{SINK}$, as illustrated in FIG. 1. The current sources can be part of a current digital-to-analog converter (DAC) used to drive the sensor in normal operation mode.

The circuit furthermore comprises comparing means, such as for example a first comparator $CMP_{HI}$ and a second comparator $CMP_{LO}$. The positive input terminal of the first comparator $CMPH_{HI}$ and the negative input terminal of the second comparator $CMP_{LO}$ are connected together.

Optionally, the positive input terminal of the first comparator $CMP_{HI}$ and the negative input terminal of the second comparator $CMP_{LO}$ may be connected to a switching means SW1 to a pin SP. Switching means SW1 may be any kind of suitable switch, such as a mechanical switch or an electronic switch such as a transistor device for example. Switching means SW1 is used for multiplexing the comparing means, e.g. the first and second comparators $CMP_{HI}$ and $CMP_{LO}$, between different sensor pins. If no switching means is provided, then the comparing means, e.g. the first and second comparators $CMP_{HI}$, $CMP_{LO}$, are always connected to one and the same sensor pin and cannot be shared.

The negative input terminal of the first comparator $CMP_{HI}$ is connected to a first voltage reference source $V_{ref1}$, which in turn is coupled to the supply power level VDD, so that the negative input terminal of the first comparator $CMP_{HI}$, is at a potential level $V_{refHI}$. The positive input terminal of the second comparator $CMP_{LO}$ is connected to a second voltage reference source $V_{ref2}$, which in turn is coupled to the ground, so that the positive input terminal of the second comparator is at a potential $V_{refLO}$.

It is to be noted that, on a printed circuit board (PCB), an energy storing element is present, such as a capacitor $C_{ext}$ that is connected between the sensor pin SP and the ground or any other fixed potential, or such as an inductor (not represented in the drawings) that is coupled in series with the load, which makes the detection of open load condition more difficult.

The error condition detection according to the present invention is done as follows.

Figure 2:
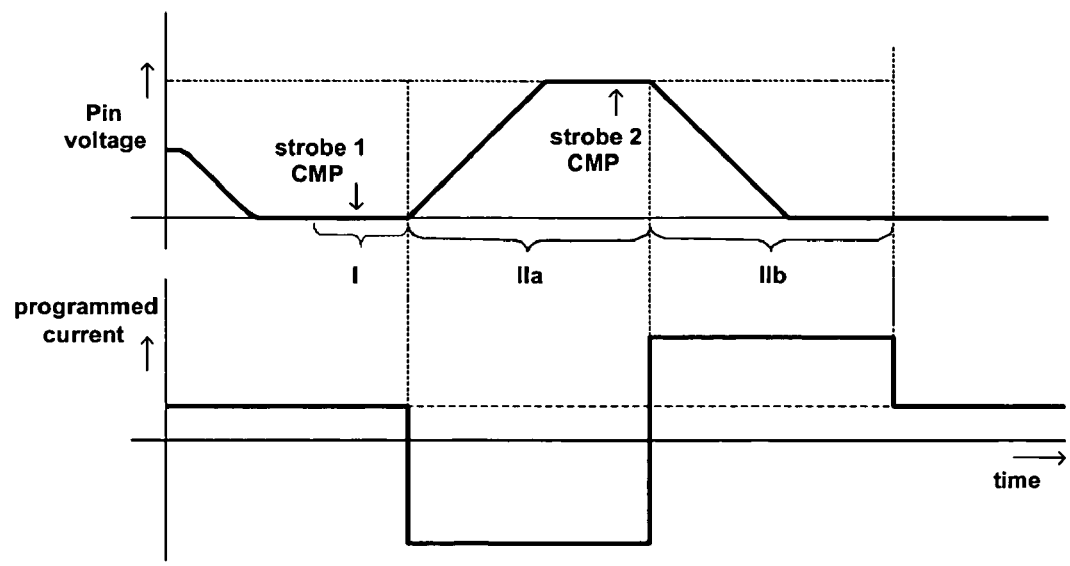
FIG. 2 illustrates a timing diagram for open load detection according to the present invention.

In a first phase, diagnosis phase I, as shown in FIG. 2, during a normal operation measurement cycle, the first and second comparators $CMP_{HI}$ and $CMP_{LO}$ are connected through switching means SW1 to the sensor pin. Output signals $OUT_{HI}$, $OUT_{LO}$ of the first and second comparators $CMP_{HI}$, $CMP_{LO}$ are strobed at strobe 1. The first and second comparators $CMP_{HI}$, $CMP_{LO}$ are monitoring whether the voltage on the pin SP goes below a certain level $V_{refLO}$ or above a certain level $V_{refHI}$. If so, for example if any of the output signals $OUT_{HI}$, $OUT_{LO}$ of the first and second comparators $CMP_{HI}$, $CMP_{LO}$ is at one, the device reports a failure on the sensor pin SP.

Table I gives an overview of possible conditions detected during diagnosis phase I.

TABLE I

| Phase I (Strobe 1) | | Phase I |
| --- | --- | --- |
| $OUT_{HI}$ | $OUT_{LO}$ | Diagnosis result |
| 0 | 0 | No error |
| 1 | 0 | Error condition (high voltage) |
| 0 | 1 | Error condition (low voltage) |

To be able to correctly distinguish between short to battery, short to ground and open load condition, a second phase of diagnosis, comprising two sub-phases IIa, IIb, needs to be activated. In normal mode, i.e. in case of non-error condition, this phase is disabled.

The second phase is activated by a processor controlling the sequence, also called a master or a master controller, only when the master is sure that there is a real problem on the sensor pin, i.e. not in case of e.g. EMC distortion of a signal. If activated without real problem, this second phase could destroy the sensor.

During the first sub-phase IIa of the second diagnosis phase, the current flowing in or out the pin SP is changed to a pre-determined polarity and to a pre-determined level. Polarity of the current depends on the type of detected error, and the amplitude of the current is, when necessary, i.e. when it is smaller than a minimum current level, increased to be able to change the voltage on the pin SP, where the external capacitor $C_{ext}$ is connected, before a second strobe period (strobe 2 in FIG. 2).

A minimum current is needed to change the voltage on the sensor pin SP in order to escape from the error condition. This minimum current is:

$$I_{DiagMin} = \frac{\Delta V \cdot C_{ext}}{t}$$

where $\Delta V$ is the voltage $V_{ref}$, $\Delta V$ is the voltage $V_{ref}$, $C_{ext}$ is the capacitance of the external capacitor connected to the sensor pin SP, t is the time between the change (and increase) of the current and the second strobe.

If the current flowing in or out the pin SP in normal operation is below the $I_{DiagMin}$ level, it is necessary to increase the current above this $I_{DiagMin}$ level to be sure to be able to escape from the error condition. It is good to provide a high margin in the current value, because current is reduced due to leakage current, higher capacitor $C_{ext}$ or tolerance of the capacitor $C_{ext}$ and so on.

Figure 3:
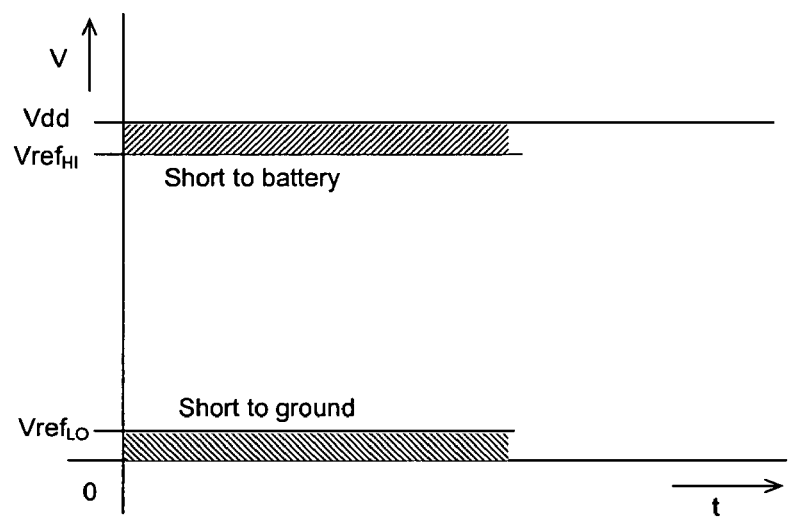
FIG. 3 illustrates the battery voltage range of a detection circuit according to the present invention, with indication of error conditions.

Polarity of the current is changed in such a way that it is tried to "escape" from the error condition (see FIG. 3). If the voltage on the pin SP is below $V_{refLO}$, which means that the load condition is either short to ground or open load, it is tried to source current from the device pin SP to increase the voltage on the pin above the $V_{refLO}$ voltage level. If this is possible, the load is in an open load condition. If, however, the voltage is stuck at ground (any voltage level below $V_{refLO}$), then the load is in a short circuit condition to ground. If the voltage on the pin SP is above $V_{refHI}$, which means that the load condition is either short to the power supply or open load, it is tried to sink current into the device pin SP to decrease the voltage on the pin below the $V_{refHI}$ voltage. If this is possible, the load is in an open load condition. If, however, the voltage is stuck at the power supply level, or any voltage level above $V_{refHI}$, then the load is in a short circuit condition to the power supply.

Table II gives an overview of possible actions during diagnosis phase IIa.

TABLE II

| Phase I (Strobe 1) | | Current polarity |
|---|---|---|
| OUT$_{HI}$ | OUT$_{LO}$ | Phase IIa |
| 0 | 0 | No change |
| 1 | 0 | Sink |
| 0 | 1 | Source |

After a pre-determined delay, which is needed in order to charge the capacitor $C_{ext}$ connected to the pin SP on the PCB, the output of the two comparators is again strobed (strobe 2 CMP in FIG. 2). A distinction can now been made between the different error conditions, as shown in Table III. It is to be noted that if the second diagnosis phase IIa is enabled, only the results of this diagnosis phase IIa are to be used as results of the diagnosis.

TABLE III

| Phase I (Strobe 1) | | Phase IIa (strobe 2) | | Phase IIa |
|---|---|---|---|---|
| OUT$_{HI}$ | OUT$_{LO}$ | OUT$_{HI}$ | OUT$_{LO}$ | Diagnosis result |
| 0 | 0 | Nothing done | | Normal operation |
| 1 | 0 | 1 | 0 | Short to power supply |
| 1 | 0 | 0 | X | Open load |
| 0 | 1 | 0 | 1 | Short to ground |
| 0 | 1 | X | 0 | Open load |

After strobing the comparators output, a reset phase IIb is initiated, during which the current is reversed, and during which the higher amplitude level of the current is kept. Thus, current polarity is as in Table IV.

TABLE IV

| Phase I (Strobe 1) | | Current polarity |
|---|---|---|
| OUT$_{HI}$ | OUT$_{LO}$ | Phase IIb |
| 0 | 0 | No change |
| 1 | 0 | Source |
| 0 | 1 | Sink |

The reset phase IIb takes at least the same time as phase IIa to be sure that the charge put in or out the capacitor $C_{ext}$ during the second diagnosis phase IIa is removed.

After this delay for the reset phase IIb, the current is reinstated to its original amplitude level and polarity of the programmed current.

The reason for the current reversing and keeping the amplitude level of the current during a certain time higher than the minimum level, as done during the reset phase IIb, is to be able to correctly detect the error in a next measurement cycle. If the current would not be at a high amplitude level during the reset phase IIb, then for small programmed currents in the next measurement cycle no error can be detected, because the voltage on the sensor pin SP will move too slowly due to the external capacitor $C_{ext}$ which is connected directly to the pin SP, as the charge put into this capacitor during the second diagnosis phase IIa is not removed then. The behaviour would be unacceptable.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A method for detecting an error condition associated with a load ($R_L$) or a connection (P) to the load ($R_L$) comprising:

during a first diagnosis phase determining whether the load ($R_L$) or the connection (P) to the load ($R_L$) is in a normal operation condition or in an error condition, and if the load ($R_L$) or the connection (P) to the load ($R_L$) is in an error condition, during a second diagnosis phase determining whether the error condition is an open load condition, short circuit condition to ground or a short circuit condition to a power supply, wherein the second diagnosis phase comprises changing a first parameter associated with the load in an attempt to escape from said error condition.

2. A method according to claim 1, wherein changing a first parameter comprises changing the polarity of a current flowing in or out the load ($R_L$).

3. A method according to claim 1, wherein changing a first parameter comprises changing the amplitude of a current flowing in or out the load ($R_L$).

4. A method according to claim 2, wherein changing a first parameter furthermore comprises changing the amplitude of a current flowing in or out the load ($R_L$).

5. A method according to claim 3, wherein changing the amplitude of the current is such that the amplitude of the current is larger than a minimum level, said minimum level being defined by formula:

$$I_{DiagMin} = \frac{\Delta V \cdot A_{ext}}{t}$$

wherein $\Delta V$ is a reference voltage, $A_{ext}$ is a memory value of an energy storing element present in the load ($R_L$) and t is the time between the change of the amplitude of the current and a moment of measuring a voltage.

6. A method according to claim 1, the load ($R_L$) being in a starting state before the first diagnosis phase, the method further comprising carrying out, after the second diagnosis phase, a resetting phase for resetting the load ($R_L$) to the starting state.

7. A method according to claim 1, wherein the first diagnosis phase comprises monitoring whether a second parameter associated with the load ($R_L$) is below a first pre-determined low level or is above a second pre-determined high level, and if so, reporting that the load ($R_L$) is in an error condition.

8. A method according to claim 7, wherein monitoring a second parameter comprises monitoring a current flowing in or out the load ($R_L$) or a voltage drop across the load ($R_L$).

9. A method according to claim 6, wherein the resetting phase comprises changing a third parameter associated with the load ($R_L$).

10. A method according to claim 9, wherein changing a third parameter comprises changing a current flowing in or out the load ($R_L$).

11. An error detection apparatus for detecting an error condition associated with a load ($R_L$) or a connection (P) to the load ($R_L$) comprising:
  first diagnosis means for determining whether the load ($R_L$) or the connection (P) to the load ($R_L$) is in a normal operation condition or in an error condition and
  second diagnosis means for, if the load ($R_L$) or the connection (P) to the load ($R_L$) is in an error condition, determining whether the error condition is an open load condition, a short circuit condition to ground or a short circuit condition to power supply and
wherein the second diagnosis means comprises means for changing a first parameter associated with the load ($R_L$) in an attempt to escape from said error condition.

12. An error detection apparatus according to claim 11, wherein said means for changing a first parameter comprises means for changing the polarity of a current flowing in or out the load ($R_L$).

13. An error detection apparatus according to claim 11, wherein said means for changing a first parameter comprises means for changing the amplitude of a current flowing in or out the load ($R_L$).

14. An error detection apparatus according to claim 12, wherein said means for changing a first parameter furthermore comprises means for changing the amplitude of a current flowing in or out the load ($R_L$).

15. An apparatus according to claim 11, wherein the load ($R_L$) comprises an energy storing element ($C_{ext}$).

16. An apparatus according to claim 11, for detecting an error condition on the load ($R_L$) in a starting state, the apparatus further comprising resetting means for resetting the load ($R_L$) to the starting state.

17. An apparatus according to claim 11, wherein the first diagnosis means comprises means for monitoring whether a second parameter associated with the load ($R_L$) is below a first pre-determined low level or is above a second pre-determined high level, and reporting means for reporting that the load ($R_L$) is in an error condition.

18. An apparatus according to claim 17, wherein the second parameter is a current flowing in or out the load ($R_L$) or a voltage drop across the load ($R_L$).

19. An apparatus according to any of claims 16, wherein the resetting means comprises means for changing a third parameter associated with the load ($R_L$).

* * * * *